INVENTOR.
JOSEPH PICKLES
ATTORNEYS

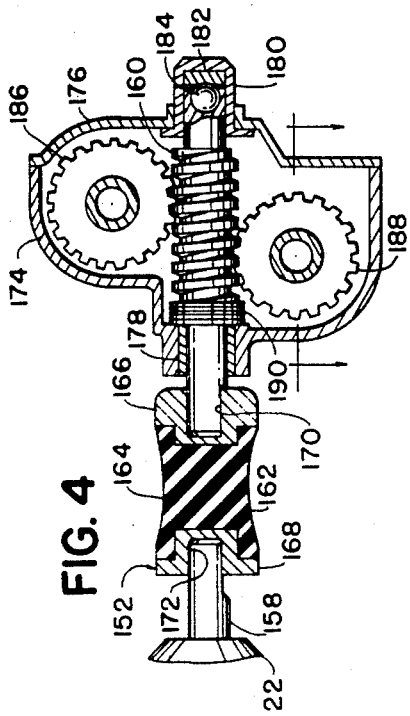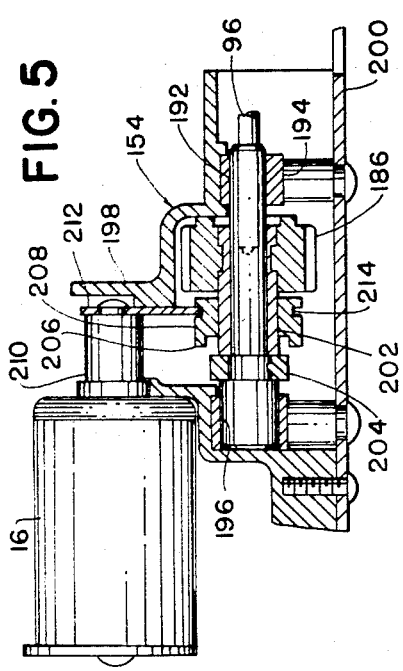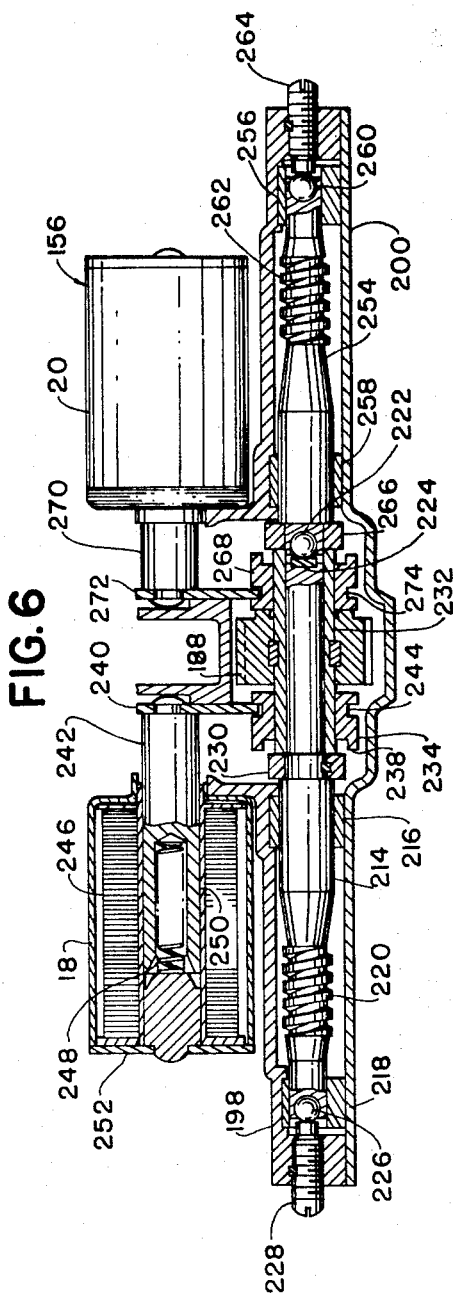

March 4, 1969 J. PICKLES 3,430,516
SIX-WAY SEAT ADJUSTER
Original Filed Aug. 23, 1965 Sheet 4 of 4

INVENTOR.
JOSEPH PICKLES
BY Whittemore,
Hulbert & Belknap
ATTORNEYS

United States Patent Office 3,430,516
Patented Mar. 4, 1969

3,430,516
SIX-WAY SEAT ADJUSTER
Joseph Pickles, Bloomfield Hills, Mich., assignor to Ferro Manufacturing Corporation, Detroit, Mich., a corporation of Michigan
Original application Aug. 23, 1965, Ser. No. 481,548. Divided and this application Aug. 18, 1967, Ser. No. 663,925
U.S. Cl. 74—665      8 Claims
Int. Cl. F16h 37/06

ABSTRACT OF THE DISCLOSURE

Drive mechanism for a seat adjuster assembly comprising a reversible drive motor, drive shaft structure connected to the drive motor including a resilient portion, a horizontal drive structure including a rotatably mounted output shaft, a sleeve rotatably mounted on the output shaft, a pinion secured to the sleeve for rotation therewith engaged by the drive shaft structure, a clutch member secured to the output shaft for rotation therewith, a clutch collar positioned on the sleeve for movement axially thereof but restrained against rotation with respect thereto, and solenoid structure engaged with said clutch collar for selectively moving the clutch collar longitudinally of the sleeve while allowing a relative rotation between the clutch collar and solenoid structure, front and rear vertical drive structure, each including a rotatably mounted output shaft having a worm portion engaged with a worm gear, which worm gear has a pinion portion, a clutch member secured to each of the output shafts for rotation therewith, a sleeve rotatably mounted on one of the output shafts between the clutch members, a pair of clutch collars positioned on the sleeve for movement axially with respect thereto but restrained against relative rotation engageable with said clutch members and separate solenoid strutcures engaged with said clutch collars for moving the clutch collars axially of the sleeve while allowing relative rotation between the clutch collars and solenoid structures and worm gear means secured to the sleeve for rotation therewith and engaged with the drive shaft structure.

Mechanical structure for providing six-way adjustment, including separate or simultaneous vertical movement of the front and rear and horizontal movement, of a seat is also disclosed in combination with the drive mechanism.

BACKGROUND OF THE INVENTION

*Cross reference to related application*

This application is a division of patent application Ser. No. 481,548, filed Aug. 23, 1965, which has now been abandoned.

*Field of the invention*

The present invention relates to seat adjusters and refers more specifically to a seat adjuster assembly including improved mechanical structure for six-way adjustment of a seat for an automobile or the like connected thereto and drive mechanism therefor, which is particularly simple, economical and efficient.

*Description of the prior art*

In the past seat adjusters have often been incapable of providing what is commonly known as six-way adjustment, that is, individual adjustment of the seat forward or backward, up or down in the rear or up or down in the front independently. Thus, in the past seat adjustors have often been provided by which a seat is movable only forward and backward or forward and back- ward and up and down in the front and rear simultaneously and not separately. Where prior seat adjusters have permitted six-way adjustment of a seat, the drive mechanisms therefor have often been complicated and therefore expensive or inefficient.

SUMMARY OF THE INVENTION

It is an object of the present invention to provide improved drive mechanism for a six-way seat adjuster or the like including a drive motor, separate drive structures for driving associated mechanical structure to produce horizontal and vertical up and down movement of the front and rear of a seat secured to the mechanical structure and separate electrically actuated clutch structures for selectively coupling the drive motor to the drive structures.

Another object is to provide six-way seat adjuster drive mechanism which is simple in construction, economical to manufacture and efficient in use.

BRIEF DESCRIPTION OF THE DRAWINGS

FIGURE 4 is an enlarged partial section view of the drive mechanism of the seat adjuster assembly illustrated in FIGURE 1 taken substantially on the line 4—4 in FIGURE 1.

FIGURE 5 is an enlarged partial section view of the drive mechanism of the seat adjuster assembly illustrated in FIGURE 1 taken substantially on the line 5—5 in FIGURE 1.

FIGURE 6 is an enlarged partial section view of the drive mechanism of the seat adjuster assembly illustrated in FIGURE 1 taken substantially on the line 6—6 in FIGURE 1.

DESCRIPTION OF THE PREFERRED EMBODIMENTS

Figure 1:
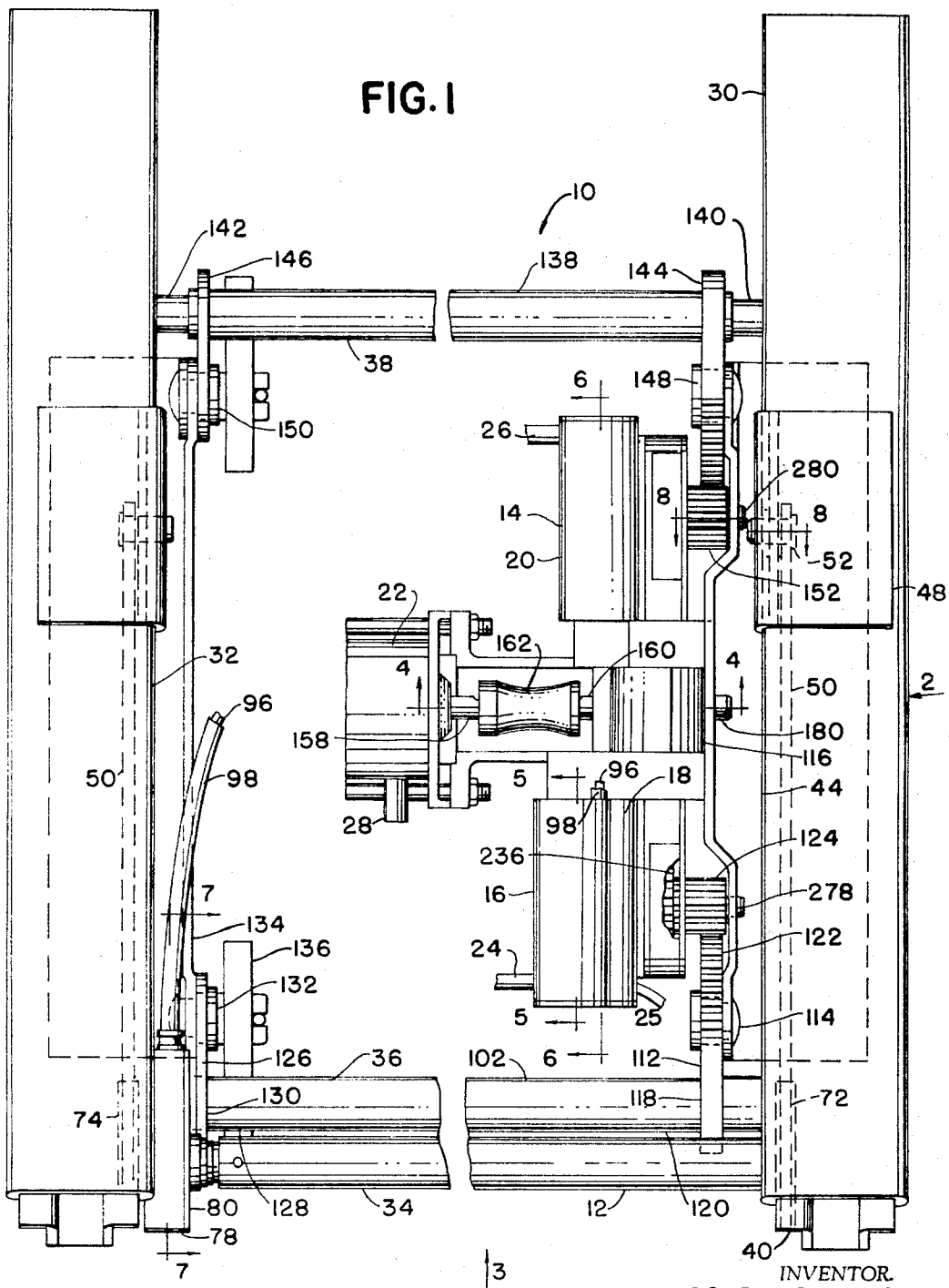
FIGURE 1 is a top view of a six-way adjuster assembly including mechanical seat adjusting structure and drive mechanism therefor constructed in accordance with the invention.
Figure 2:
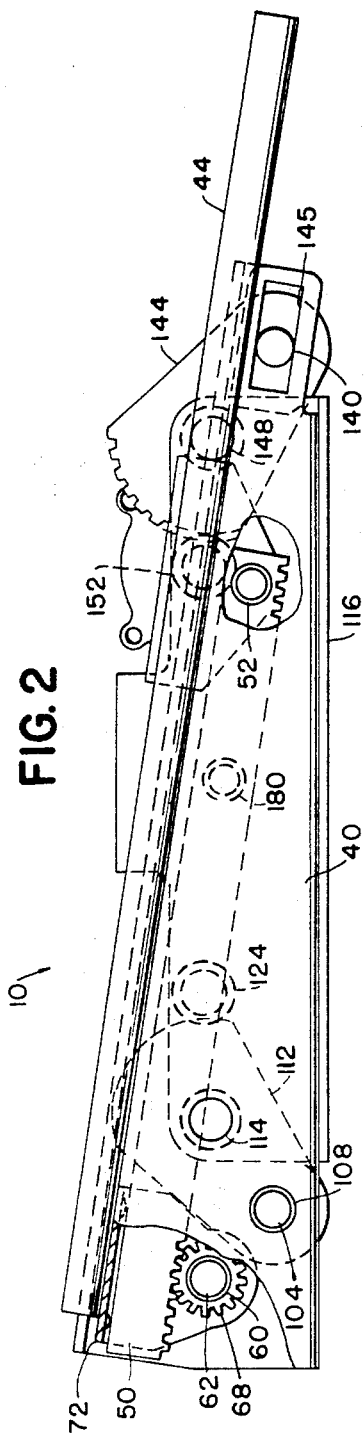
FIGURE 2 is a partly broken away side view of the seat adjuster assembly illustrated in FIGURE 1 taken in the direction of arrow 2 in FIGURE 1.

The seat adjuster assembly 10 illustrated in FIGURES 1–8 includes the mechanical structure 12 and the drive mechanism 14 for driving the mechanical structure 12 to move a seat secured thereto forward or backward and up or down in the front and rear separately on energization thereof. The drive mechanism 14 may be energized by electric control structure similar to that illustrated in United States Patent No. 3,105,670 connected to solenoids 16, 18 and 20 and motor 22 through electrical conduits 24, 25, 26 and 28 as will be understood by those in the art. The particular electrical control circuit used with the seat adjuster assembly 10 forms no part of the present invention and will therefore not be considered in detail herein.

More specifically the mechanical structure 12 includes a track assembly 30 and a track assembly 32 at the opposite sides thereof to which a seat to be adjusted may be secured. The mechanical structure 12 further includes a horizontal torsion bar assembly 34 extending transversely between the track assemblies 30 and 32 at the front thereof and front and rear vertical torsion bar assemblies 36 and 38 respectively, also extending transversely between the track assemblies 30 and 32 at the front and rear thereof.

The track assemblies 30 and 32 are substantially the same. Therefore only the track assembly 30 will be considered in detail. As shown best in FIGURES 1, 2, 3 and 8, the track assembly 30 includes the track 40 which is substantially U-shaped in cross section and includes the outwardly extending flanges 42 at the open top thereof on which the C-shaped track 44 is positioned for longitudinal sliding. Anti-friction bearing members 46 are provided between the track 40 and slide 44. A bracket 48 is secured to the top of the slide 44 for movement therewith by convenient means, such as welding (not shown).

Figure 8:
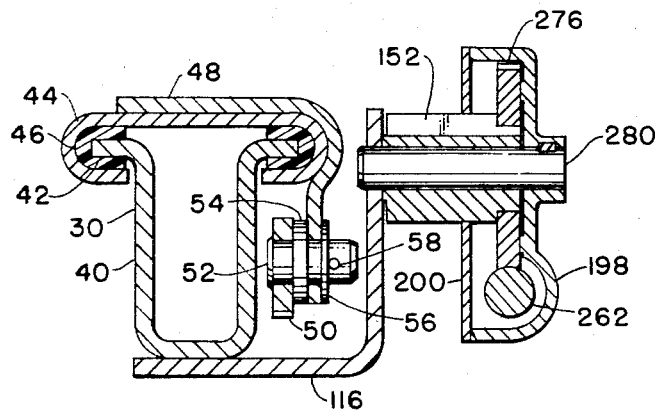
FIGURE 8 is an enlarged partial section view of the mechanical structure of the seat adjuster assembly illustrated in FIGURE 1 taken substantially on the line 8—8 in FIGURE 1.

The bracket 48 is connected to a rack 50, best shown in FIGURE 8, by means of pivot pin 52. Rack 50 is spaced from the bracket 48 by a spacer 54 while the pivot pin 52 is held in position by washer 56 in conjunction with pin 58. In operation on longitudinal movement of the rack 50, the bracket 48 and slide 44 connected thereto are moved longitudinally of the track structure 30 to produce movement of a seat connected directly to the slide 44.

Figure 3:
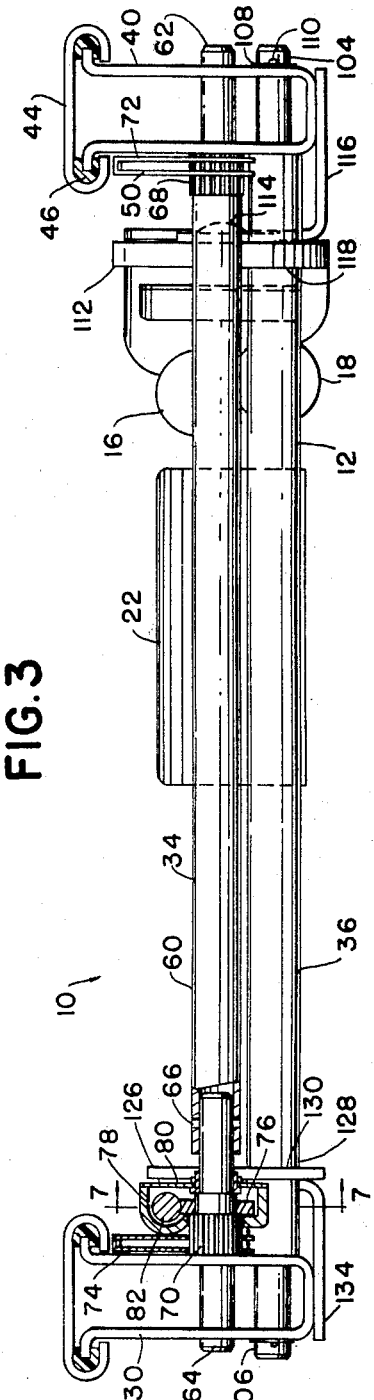
FIGURE 3 is a partly broken away front view of the seat adjuster assembly illustrated in FIGURE 1 taken in the direction of arrow 3 in FIGURE 1.

The horizontal torsion bar assembly 34, as best shown in FIGURES 1, 2, 3 and 7, includes a torsion bar 60 connected at opposite ends to horizontal pinion pins 62 and 64 by pins, such as pin 66. The pinion pins 62 and 64 include the pinion portions 68 and 70 respectively over which the U-shaped rack brackets 72 and 74 are sleeved. The racks 50 are held in engagement with the pinion portions 68 and 70 of the pinion pins 62 and 64 by the rack brackets 72 and 74 which are rotatably mounted on the pinion portions 68 and 70. As illustrated in FIGURE 3 the pinion pins 62 and 64 extend completely through the track members 40 so that the torsion bar 60 is carried by the track members 40.

Figure 7:
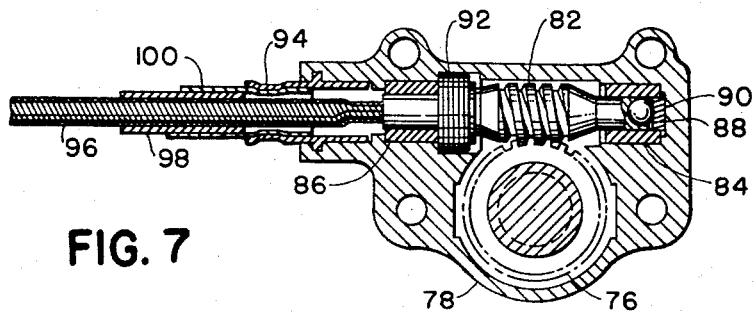
FIGURE 7 is an enlarged partial section view of the mechanical structure of the seat adjuster assembly illustrated in FIGURE 1 taken substantially on the line 7—7 in FIGURE 1.

The horizontal torsion bar assembly 34 further includes a worm gear 76 fixed to the pinion pin 64 for rotation therewith which is housed in a housing 78 having cover 80. As best shown in FIGURE 7 the worm gear 76 is driven by worm 82 rotatably mounted in bearings 84 and 86 in housing 78. The worm 82 is positioned between bearing 88 on bearing plate 90 and washers 92. A ferrule 94 is connected to the housing 78 for securing a flexible drive cable 96 from drive mechanism 14 and having cover 98 and mating ferrule 100 thereon to the worm 82. The actual connection between the cable 96 and worm 82 may be made by means of a non-circular cross section on the end of the cable 96 and a similarly non-circular recess in the end of the worm 82 in the usual manner.

As will be seen subsequently, in operation when the solenoid 16 is energized the cable 96 is caused to be rotated through the drive mechanism 14 by the motor 22 to produce rotation of the worm 82 and worm gear 76. The torsion bar 34 and the pinion pins thereon are also caused to rotate about their longitudinal axis to move the racks 72 and 74 longitudinally and thus drive the slides 44 to position a seat connected thereto forward or backward as required on rotation of worm gear 76.

The front vertical torsion bar assembly 36 includes the torsion bar 102 having torsion bar studs 104 and 106 respectively secured to the ends thereof by convenient means (not shown), such as pins similar to pins 66. The torsion bar studs 104 and 106 extend through the tracks 40 and are secured thereto by washers 108 and pins 110.

As shown best in FIGURE 1, a sector lever 112 is pivotally mounted by means of pivot pin 114 to an L-shaped bracket 116 at the right end of the torsion bar 102 in FIGURE 1. The L-shaped bracket 116 may be permanently secured in a fixed position on, for example, the floor of an automobile. End 118 of lever 112 is rigidly secured to the end 120 of torsion bar 102 while end 122 of lever 112 includes a sector portion engaged with the pinion 124 of the drive mechanism 14.

Lever 126 is rigidly connected to end 128 of the torsion bar 36 at one end 130 and is pivotally connected by means of pivot pin 132 to a fixedly mounted L-shaped bracket 134 at the left in FIGURE 1 which is similar to L-shaped bracket 116.

Thus in operation on rotation of the pinion 124 by motor 22 on energizing the solenoid 18 the sector lever 112 is caused to pivot about the pivot pin 114 to raise or lower the torsion bar 36 and thus the front ends of the tracks 40 connected thereto by means of the torsion studs 104 and 106. The front of a seat connected to the slides 44 may thus be raised or lowered depending on the direction of rotation of the motor 22. A stop bar 136 is provided to determine a lowermost position for the torsion bar 102.

The rear vertical torsion bar assembly 38 is similar to the front vertical torsion bar assembly 36 and includes a torsion bar 138, torsion studs 140 and 142 and sector lever 144 and lever 146 pivoted to the brackets 116 and 134 respectively by pivot pins 148 and 150. Sector lever 144 is pivotally connected to track 40 by lost motion connection 145.

Again the torsion studs 140 and 142 extend completely through the tracks 40. Thus on rotation of the pinion 152 on energization of the solenoid 20 the rear of the tracks 40 are raised or lowered.

The drive mechanism 14 includes the motor and drive shaft structure 152 best shown in FIGURE 4. A horizontal drive structure 154 shown best in FIGURE 5 and front and rear vertical drive structure 156 illustrated best in FIGURES 6 and 8 are also included in the drive mechanism 14.

The motor and drive shaft structure 152 includes the reversible motor 22 having output shaft 158 connected to worm 160 through the resilient coupling 162. The resilient coupling 162 comprises a rubber member 164 bonded to the metal end members 166 and 168 having recesses 170 and 172 respectively therein mating with the out-of-round ends of the drive shaft 158 and worm 120, as shown best in FIGURE 4.

The worm 160 is mounted for rotation within the housing 174 having cover 176 by means of the bearings 178 and 180. A bearing plate 182 is positioned in the bearing 180 and is acted upon by the ball 184 carried by the worm 160. The worm 160 is engaged with the separate worm gears 186 and 188 included in the horizontal drive structure 154 and the vertical drive structure 156 respectively.

In operation the motor 22 is energized to rotate the shaft 158 in opposite directions and the worm 160 is rotated in opposite directions through the resilient coupling 162 to drive the worm gears 186 and 188. Shock loading of the motor 22 and worm 160 which could cause failure of the worm 160 or drive shaft 158 is thus prevented since shocks are absorbed in the resilient coupling 162 therebetween.

The horizontal drive structure 154 includes the shaft 192 rotatably mounted in bearings 194 and 196 secured in housing 198 having cover 200. The worm gear 186 is secured for rotation to the sleeve 202 positioned over the shaft 192. A clutch member 204 having clutch dogs thereon engageable with the clutch dogs 206 on the clutch collar 208 is fixedly secured to the shaft 192 for rotation therewith. The clutch collar 208 is mounted on the sleeve 202 against relative rotation and is movable axially thereof. The axial position of the clutch collar 208 on the sleeve 202 is changed to engage the clutch dogs of the clutch member 204 and the clutch collar 208 on energization of the solenoid 16 to move the solenoid armature 210 and the yoke 212 connected thereto and positioned within the annular recess 214 in the clutch collar 208 toward the solenoid 16.

Thus in operation when the solenoid 16 is energized the armature 210 is moved to the left in FIGURE 5 along with the yoke 212 which moves the clutch collar 208 into engagement with the clutch member 204. Since the clutch collar 208 is rotated with the sleeve 202 connected to the worm gear 186, the clutch member 204 will thus be caused to rotate when the motor 22 is energized to rotate the worm gear 186. Rotation of the clutch member 204 causes rotation of the shaft 192 and subsequent rotation of the flexible drive cable 96 connected to the shaft 192 by mating out-of-round portions and consequent movement of the slides 30 forward or rearward in accordance with the direction of rotation of the motor 22 as previously considered.

The vertical movement structure 156 as shown best in FIGURE 6 includes the shaft 214 rotatably mounted in bearings 216 and 218 carried in housing 198. Shaft 214 includes the worm gear 220 carried thereby for rotation therewith and is positioned between the ball 222 in engagement with bearing plate 224 at one end thereof and the ball 226 at the other end. The worm 220 is variably positioned axially along with the shaft 214 by means of the adjusting bearing screw 228.

The clutch member 230 is secured to the shaft 214 for rotation therewith. Sleeve 232 is sleeved over the shaft 214 for rotation relative thereto and is rigidly secured to the worm gear 188 for rotation therewith. The clutch collar 234 is secured to the sleeve 232 by convenient means, such as splines for rotation therewith and axial movement therealong to engage the dogs 238 with the clutch member 230 on movement of the yoke 240 toward the solenoid 18 with movement of the armature 242 into the solenoid 18. The yoke 240 is engaged with the clutch collar 234 by means of the annular recess 244 included therein.

The solenoid 18, as best shown in FIGURE 6, is similar to the solenoids 16 and 20 and includes the coil 246 and spring 248 in addition to the core 250 positioned in the housing 252 as shown in FIGURE 6.

The vertical movement structure 156 further includes the shaft 254 rotatably mounted in bearings 256 and 258 carried by housing 198 having the balls 222 and 260 at the opposite ends thereof and the worm 262 centrally thereof. Again the worm 262 and shaft 254 are adjustably positioned axially by means of the adjusting bearing screw 264. The clutch member 266 is rigidly secured to the shaft 254 for rotation therewith while the clutch collar 268 is mounted on the sleeve 232 for rotation therewith and axial movement with respect thereto on movement of the armature 270 of solenoid 20 and yoke 272 toward the solenoid 20. The yoke 272 is engaged in the annular recess 274 of the clutch collar 268.

The drive assembly 14 further includes worm gears 236 and 276 connected to drive pinions 124 and 152 which are supported by pins 278 and 280 on the L-shaped bracket 116. The pinions 124 and 152 are rotatably mounted on the pins 278 and 280 and the pins are fixedly secured to the housing 198. Thus on energizing the solenoid 18 at the same time the motor 22 is energized the clutch collar 234 is engaged with the clutch member 230 to produce rotation of the shaft 214 and worm 220 to drive worm gear 236 and pinion 124 to move the track 40 up or down depending on the direction of operation of the motor 22. In a similar manner on energizing the solenoid 20 the clutch collar 268 is engaged with the clutch member 266 to rotate with the pinion 152 to move the rear of the tracks 40 up or down.

Thus it will be seen that in overall operation of the seat adjuster assembly illustrated in FIGURES 1–8 that if it is desired to adjust a seat secured to the slides 44 forward or backward the motor 22 is energized in a particular direction associated with forward or backward movement of the seat. The solenoid 16 is energized to engage the clutch collar 208 with the clutch member 204 whereby the worm 282 is driven through flexible shaft 96 and the torsion bar 60 is rotated so that the pinion portions 68 and 70 of the pinion pins 62 and 64 are rotated to move the racks 72 and 74 longitudinally. Since the racks 72 and 74 are pivotally connected to the brackets 48, the slides 44 will be moved forward or backward to position a seat secured thereto in accordance with the direction of operation of the motor 22.

When it is desired to move a seat secured to the slide 44 up or down in front the motor 22 is energized in a direction associated with the desired movement of the seat and the solenoid 18 is energized to engage the clutch collar 234 with the clutch member 230. Rotation of the pinion 124 is thus effected to pivot the sector lever 122 and therefore move the torsion bar 103 about the pivot pin 114. Since the pivot pins 104 and 106 of the torsion bar 102 are connected to the tracks 40 the front of the tracks 40 will be moved up or down in accordance with the direction of operation of the motor 22.

Similarly up or down movement of the rear of a seat connected to the slides 44 may be accomplished by energizing the solenoid 20 to cause rotation of the pinion 152 in a direction determined by the direction of rotation of the motor 22 and consequent pivotal movement of the sector lever 144 and torsion bar 138 about the pivot member 148.

It will also be readily understood that depending on the control circuit used in conjunction with the seat adjuster assembly 10 disclosed herein, and the particular adjustment of the seat desired the indicated adjustments may be made individually or simultaneously as desired. Further it will be understood that the seat adjusting assembly 10 as disclosed herein is particularly simple, economical and efficient.

While one embodiment of the present invention has been considered in detail, it will be understood that other embodiments and modifications thereof are contemplated. It is the intention to include all embodiments and modifications as are defined by the appended claims within the scope of the invention.

What I claim as my invention is:

1. Drive mechanism for a seat adjuster assembly or the like comprising a reversible drive motor, drive shaft structure connected to said drive motor, front and rear vertical drive structure and a horizontal drive structure each including a rotatably mounted output shaft, a sleeve rotatably mounted on said output shaft, a worm gear secured to the sleeve for rotation therewith engaged by the drive shaft structure, a clutch member secured to the output shaft for rotation therewith, a clutch collar positioned on the sleeve for movement axially of the sleeve but restrained against rotation with respect thereto and solenoid structure engaged with said clutch collar for selectively moving the clutch collar longitudinally of the sleeve while allowing relative rotation between the clutch collar and solenoid structure.

2. Structure as set forth in claim 1 wherein the output shaft of the vertical drive structure is rotatably supported in bearings positioned at one end and centrally of the output shaft and the sleeve, worm gear, clutch member and clutch collar are supported on the other end of the output shaft of the vertical drive structure and further including a second rotatably mounted vertical drive output shaft axially aligned with the first mentioned vertical drive output shaft, a second clutch member secured to one end of the second output shaft, a second clutch collar secured on the sleeve of the vertical drive structure for movement axially with respect thereto but restrained against rotation relative thereto engageable with said second clutch member and a separate solenoid structure engaged with said second clutch collar for moving the second clutch collar axially of the sleeve while allowing relative rotation between the second clutch collar and separate solenoid structure.

3. Structure as set forth in claim 2 wherein the drive shaft structure includes a drive shaft connected to said motor, a worm axially aligned with the drive shaft connected to said motor and a resilient coupling between the drive shaft connected to said motor and worm.

4. Drive mechanism for a seat adjusted assembly or the like comprising a reversible drive motor, a drive shaft connected to said drive motor, worm means rotatably mounted in axial alignment with the drive shaft, horizontal drive structure including a rotatably mounted horizontal drive output shaft extending substantially perpendicularly to the drive shaft, a horizontal drive sleeve rotatably mounted on said horizontal drive output shaft, a horizontal drive worm gear secured to the horizontal drive sleeve for rotation therewith engaged by the worm means for rotation thereby, a horizontal drive clutch member secured to the horizontal drive output shaft for rotation therewith, a horizontal drive clutch collar positioned on the horizontal drive sleeve for movement axially thereof but restrained against rotation with respect thereto and horizontal drive solenoid structure engaged with said horizontal drive clutch collar for selectively moving the horizontal drive clutch collar longitudinally of the horizontal drive sleeve while allowing relative rotation between the horizontal drive clutch collar and horizontal drive solenoid structure to engage the horizontal drive clutch collar with the horizontal drive clutch member whereby the horizontal drive output shaft is caused to rotate with the horizontal drive worm gear, a front and rear vertical drive structure including a pair of axially aligned rotatably mounted vertical drive output shafts extending substantially perpendicularly to the drive shaft connected to said drive motor and in spaced relation with respect to the horizontal drive shaft, each including a worm portion engaged with a worm gear having a pinion portion, a separate vertical drive clutch member secured to each of the vertical drive output shafts for rotation therewith, a sleeve rotatably mounted on one of the vertical drive output shafts between the vertical drive clutch members, a pair of vertical drive clutch collars positioned on the vertical drive sleeve for movement axially with respect thereto but restrained against relative rotation engageable with said vertical drive clutch members and separate solenoid structures engaged with said vertical drive clutch collars for moving the vertical drive clutch collars axially of the vertical drive sleeve while allowing relative rotation between the vertical drive clutch collar and vertical drive solenoid structures and worm gear means secured to the vertical drive sleeve for rotation therewith and engaged with the worm means.

5. Structure as set forth in claim 4 wherein the horizontal drive structure further includes a Bowden wire secured to the horizontal drive structure output shaft at one end, rotatably mounted second worm means secured to the other end of the Bowden wire, a second horizontal drive worm gear engaged with the second horizontal drive worm means connected to the Bowden wire having a pinion portion thereon and rack means engaged with the pinion portion of the second horizontal drive worm means.

6. Structure as set forth in claim 4 and further including a resilient coupling between the drive shaft connected to the motor and the worm means aligned with the motor drive shaft.

7. Horizontal drive structure for a seat adjuster or the like comprising a rotatably mounted output shaft, a sleeve rotatably mounted on said output shaft, a pinion secured to the sleeve for rotation therewith engaged by the drive shaft structure, a clutch member secured to the output shaft for rotation therewith, a clutch collar positioned on the sleeve for movement axially thereof but restrained against rotation with respect thereto and solenoid structure engaged with said clutch collar for selectively moving the clutch collar longitudinally of the sleeve while allowing relative rotation between the clutch collar and solenoid structure.

8. Vertical drive structure for a seat adjuster or the like comprising a pair of rotatably mounted axially aligned output shafts each including a worm portion engaged with a worm gear which worm gear has a pinion portion, a clutch member secured to each of the output shafts for rotation therewith, a sleeve rotatably mounted on one of the output shafts between the clutch members, a pair of clutch collars positioned on the sleeve for movement axially with respect thereto but restrained against relative rotation engageable with said clutch members and separate solenoid structures engaged with said clutch collars for moving the clutch collars axially of the sleeve while allowing relative rotation between the clutch collars and solenoid structures and worm gear means secured to the sleeve for rotation therewith and engaged with the drive shaft structure.

References Cited

UNITED STATES PATENTS

| | | | |
|---|---|---|---|
| 1,721,400 | 7/1931 | Lepage. | |
| 2,931,424 | 4/1960 | Pickles. | |
| 3,066,907 | 12/1962 | Latimer et al. | 248—420 |
| 3,079,118 | 2/1963 | Pickles | 248—420 |
| 3,105,668 | 10/1963 | Pickles et al. | 248—394 |
| 3,155,363 | 11/1964 | Lohr | 248—419 |
| 3,167,296 | 1/1965 | Pickles | 248—419 |
| 3,188,044 | 6/1965 | Epple | 248—419 |

DONLEY J. STOCKING, *Primary Examiner.*

LEONARD H. GERIN, *Assistant Examiner.*

U.S. Cl. X.R.

192—48; 248—420